(12) United States Patent
Lee

(10) Patent No.: US 7,177,124 B2
(45) Date of Patent: Feb. 13, 2007

(54) BRUSHLESS DC FAN MOTOR DRIVING CIRCUIT

(75) Inventor: Jian-Xuan Lee, Hsin-Chuang (TW)

(73) Assignee: Datech Technology Co., Ltd., Taipei Hsien (TW)

( * ) Notice: Subject to any disclaimer, the term of this patent is extended or adjusted under 35 U.S.C. 154(b) by 160 days.

(21) Appl. No.: 10/834,924

(22) Filed: Apr. 30, 2004

(65) Prior Publication Data

US 2005/0243482 A1    Nov. 3, 2005

(51) Int. Cl.
*H02H 7/09* (2006.01)
(52) U.S. Cl. ................................. 361/33
(58) Field of Classification Search ............ 361/33
See application file for complete search history.

(56) References Cited

U.S. PATENT DOCUMENTS

| | | | |
|---|---|---|---|
| 4,070,606 A * | 1/1978 | Morozumi et al. | 318/254 |
| 4,169,990 A * | 10/1979 | Lerdman | 318/138 |
| 4,495,450 A * | 1/1985 | Tokizaki et al. | 318/138 |
| 5,267,842 A * | 12/1993 | Harmsen et al. | 417/354 |
| 5,744,921 A * | 4/1998 | Makaran | 318/254 |
| 6,396,231 B1 * | 5/2002 | Horng et al. | 318/471 |
| 6,611,410 B1 * | 8/2003 | Makaran | 361/84 |
| 2005/0035732 A1* | 2/2005 | Horng et al. | 318/434 |

OTHER PUBLICATIONS

Sanyo, LB1868M Two-Phase Brushless Fan Motor Driver data sheet, Aug. 2000, pp. 1 and 3-4.*

* cited by examiner

*Primary Examiner*—Brian Sircus
*Assistant Examiner*—Ann Hoang
(74) *Attorney, Agent, or Firm*—Troxell Law Office, PLLC

(57) ABSTRACT

The present invention is a brushless DC fan motor driving circuit, comprising a control unit, a Hall element, a temperature sensor with negative temperature coefficient, and a motor, as tied in with a plurality of resistors, capacitors, diodes and transistors. Accordingly, through sensing environment temperature by the temperature sensor and feeding back the temperature sensed to the motor to control the resolving speed, the ambient temperature of the system is maintained.

21 Claims, 6 Drawing Sheets

BRUSHLESS DC FAN MOTOR DRIVING CIRCUIT

FIELD OF INVENTION

The present invention relates to a brushless DC fan motor driving circuit; more particularly, relates to sensing the running temperature of a motor by a temperature sensor with negative temperature coefficient (NTC) and feeding it back to control the resolving speed of the motor.

DESCRIPTION OF RELATED ART

As is known about the motor control circuit of the prior art (as shown in FIG. 6), the first pin of the control unit G is connected with the second pin through a Hall element A; the sixth pin is connected with the ninth pin through a motor B; a diode D is connected with the motor B; a first resister E is connected with the fourteenth pin through the diode D; a second resistor F is connected with the fourteenth pin; and the Hall element A is connected with the second resister. Accordingly, a motor control circuit is constructed.

Although the on and off of the motor B can be controlled by the above motor control circuit, the motor B is simply connected with the fourteenth pin through a diode D and a first resister E to form a simple control circuit and the current applied to the motor is fixed so that the motor can only resolve at a fixed (high) rate. If the ambient temperature is too high, the control circuit could not respond accordingly and the whole system and the control unit would become over heated and so the whole system would stop working.

BRIEF DESCRIPTION OF INVENTION

The main purpose of the present invention is to have a temperature sensor with negative temperature coefficient (NTC) to sense the temperature and feed it back so that an adequate current is offered to control the running of the motor.

To achieve the above purpose, the present invention is a brushless DC fan motor driving circuit with a control unit. The present invention takes LB1868M as an example of the control unit, which is not intended for any limitation. The control unit of the present invention can be made by way of System on Chip (SOC), Single Chip or Hardware Script Language (HSL). Since the control unit of LB1868M is taken as an example:

The first pin (IN−) of the control unit is connected with the fourth pin (IN−) of a Hall element.

The second pin (IN+) of the control unit is connected with the second pin (IN+) of the Hall element.

The third pin (CT) of the control unit is connected with a first capacitor and is connected with the third pin of the Hall element and then is grounded.

The sixth pin (OUT1) of the control unit is connected with a first, a second, a third and a fourth resistors. The fourth resistor is connected with the ninth pin (OUT2) of the control unit. The first resistor is connected with the second resistor through the base of a third transistor. The third resistor is connected with the fourth resistor through the base of a fourth transistor. The emitter of the third transistor is connected with that of the fourth transistor through a first diode. The first diode is connected with a power supplier. The collector of the third diode is connected with that of the fourth resistor through a motor. The motor is connected with a second diode and a third diode. The second diode is connected with the third diode through a Zener diode. The Zener diode is connected with a second transistor. The second transistor is connected with a fifth, a sixth and a seventh resisters. The sixth resister is connected with the Zener diode. The seventh resister is connected with the power supplier. The fifth resistor is connected with the seventh resistor through the base of a first transistor. The collector of the first transistor is connected with an eighth resistor, and the emitter of it is connected with a fourth diode. The fourth diode is connected with a ninth resistor and the temperature sensor with NTC. The temperature sensor with NTC is connected with the power supplier and the third pin of the connector. And the second pin of the connector is connected with the ninth resistor and then is grounded.

The seventh pin (GND) of the control unit is grounded.

The tenth pin (Z1) of the control unit is connected with the eleventh pin (Z2).

The thirteenth pin (RD) of the control unit is connected with the first pin of the connector.

The fourteenth pin (VIN) of said control unit is connected with a tenth resistor. The tenth resistor is connected with the first pin of the Hall element. The fourteenth pin (VIN) of the control unit is connected with an eleventh resistor, which is connected with a power supplier, and a second capacitor, which is to be grounded. The second capacitor is connected with the seventh pin of the control unit.

Accordingly, through sensing the running temperature of the motor with a temperature sensor with NTC and feeding it back and so offering an adequate current, the running of the motor is under control.

BRIEF DESCRIPTION OF THE DRAWINGS

The present invention will be better understood from the following detailed description of preferred embodiment of the invention, taken in conjunction with the accompanying drawings, in which.

DESCRIPTION OF PREFERRED EMBODIMENT

Figure 1:
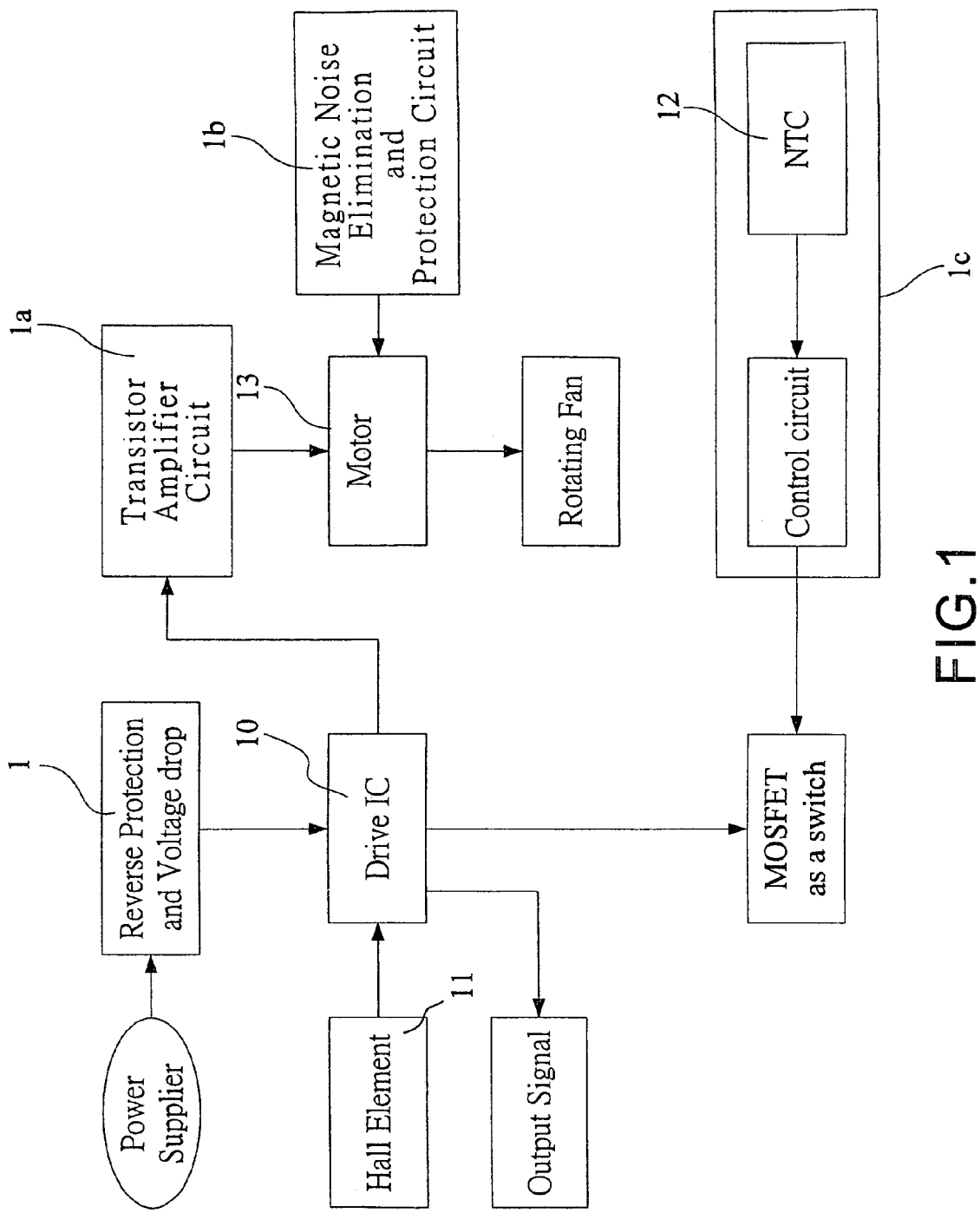
FIG. 1 is a block diagram showing the architecture according to the present invention.
Figure 2:
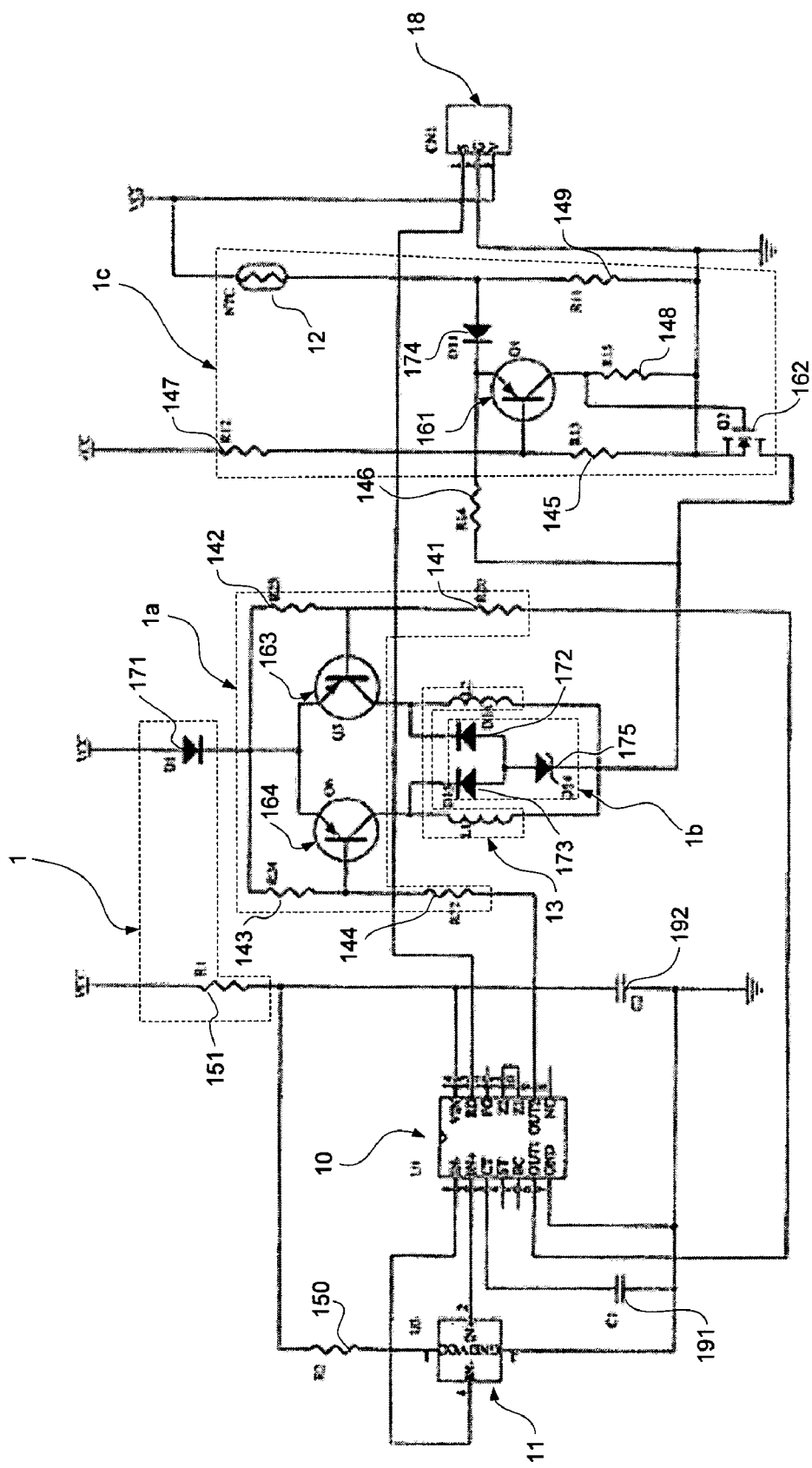
FIG. 2 is a circuit diagram showing the architecture according to the present invention.
Figure 3:
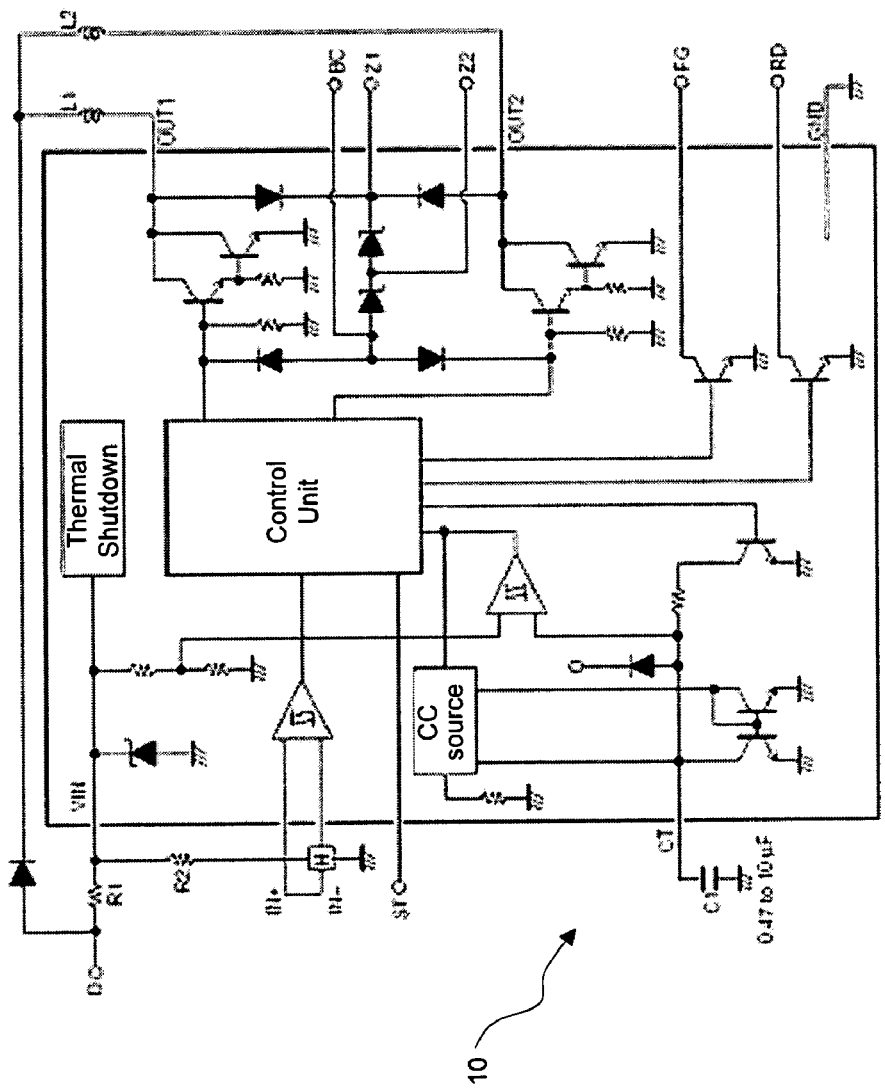
FIG. 3 is a circuit diagram showing the control unit according to the present invention.

The following descriptions of the preferred embodiment are provided to understand the features and the structures of the present invention.

Please refer to FIG. 1 to FIG. 5, which are a block diagram showing the architecture, a circuit diagram showing the architecture, a circuit diagram showing the control unit, a scope image whose upper half shows the current waveform of the motor at low resolving speed and the lower half shows the corresponding standard signal line waveform of the thirteenth pin of the control unit, and a scope image whose upper half shows the current waveform of the motor at high resolving speed and the lower half shows the corresponding standard signal line waveform of the thirteenth pin of the control unit, according to the present invention. As shown in the figures, the present invention is a brushless DC fan motor driving circuit, comprising a control unit 10, a Hall element 11, a temperature sensor 12 with negative temperature coefficient (NTC), a motor 13, and a connector 18, as tied in with a plurality of transistors, diodes, resistors and capacitors. Accordingly, through sensing ambient temperature by the temperature sensor 12 with NTC and feeding it back, the temperature is maintained by controlling the resolving speed of the motor 13, wherein the control unit 10 is tied in with current limiting circuit 151 to offer proper current to avoid thermal shutdown.

The control unit 10 is the pivot of the control circuit and it can be an LB1868M chip or a single chip of the same function.

Therein, the first pin (IN-) of the control unit 10 is connected with the fourth pin (IN-) of the Hall element 11 and the Hall element 11 is to detect the position of the rotor of the motor 13 to acquire the running status.

The second pin (IN+) of the control unit 10 is connected with the second pin (IN+) of the Hall element 11.

The third pin (CT) of the control unit 10 is connected with a first capacitor 191 and the third pin (IN+) of the Hall element 11, and then is grounded.

The sixth pin (OUT1) of the control unit 10 is connected with a first, a second, a third and a fourth resistors 141, 142, 143, 144. The fourth resistor 144 is connected with the ninth pin (OUT2) of the control unit 10. The first resistor 141 is connected with the second resistor 142 through the base of a third transistor 163. The third resistor 143 is connected with the fourth resistor 144 through the base of a fourth transistor 164. The emitter of the third transistor 163 is connected with that of the fourth transistor 164 through a first diode 171. The first diode 171 is connected with a power supplier. The collector of the third transistor 163 is connected with that of the fourth transistor 164 through the motor 13. The motor 13 is connected with a second diode 172 and a third diode 173. The second diode 172 is connected with the third diode 173 through a Zener diode 175. The Zener diode 175 is connected with a second transistor 162. The second transistor 162 is connected with a fifth, a sixth and a seventh resisters 145, 146, 147. The sixth resister 146 is connected with the Zener diode 175. The seventh resister 147 is connected with the power supplier. The fifth resister 145 is connected with the seventh resister 147 through the base of a first transistor 161. The collector of the first transistor 161 is connected with an eighth resistor 148, and the emitter of the first transistor 161 is connected with a fourth diode 174. The fourth diode 174 is connected with a ninth resistor 149 and the temperature sensor 12 with NTC. The temperature sensor 12 with NTC is connected with the power supplier and the third pin of the connector 18. And the second pin of the connector 18 is connected with the ninth resistor 149, and then is grounded.

The seventh pin (GND) of the control unit 10 is grounded.

The tenth pin (Z1) of the control unit 10 is connected with its eleventh pin (Z2).

The thirteenth pin (RD) of the control unit 10 is connected with the first pin of the connector 18. The fourteenth pin (VIN) of the control unit 10 is connected with a tenth resistor 150. The tenth resistor 150 is connected with the first pin of the Hall element 11. The fourteenth pin (VIN) of the control unit 10 is connected with an eleventh resistor 151 which is connected with a power supplier, and is connected with a second capacitor 192 which is grounded. The eleventh resistor 151 is a current limiting resistor to avoid heat effects out of overloading current, and is connected with the seventh pin of the control unit 10 through the second capacitor 192. Accordingly, so constructed are a circuit 1 for reverse protection and voltage drop, a transistor amplifier circuit 1a, a magnetic noise elimination and protection circuit 1b, a temperature sensor 12 with NTC and a temperature control circuit 1C. (as shown in FIG. 1)

The circuit 1 for reverse protection and voltage drop comprises the eleventh resistor 151 and the first diode 171. By the first diode 171, the feedback of the reverse voltage is avoided; and, in case the connector 18 is wrongly plugged, the control unit 10 is protected from destruction. The voltage of the control unit 10 can be kept in an acceptable range by using the eleventh resistor 151.

The transistor amplifier circuit 1a comprises a first, a second, a third and a fourth resistors 141, 142, 143, 144, and a third and a fourth transistors 163, 164. Because the power output by the control unit 10 is fixed, in order to amplify the power output, two transistors are added (the third and the fourth transistors 163, 164) for amplification. Darlington pair is the key here, wherein the four resistors around (the first, the second, the third and the fourth resistors 141, 142, 143, 144) are biasing voltage resistors.

The magnetic noise elimination and protection circuit 1b comprises a second, a third and a Zener diodes 172, 173, 175, and are connected with the two ends of the coil (the motor 13) to avoid the counter-electromotive force (CEMF) of the coil. Therein, the Zener diode is to stabilize the voltage by suppressing the CEMF to be on the same voltage and absorbing the overloading part. At the same time, the small amount of magnetic noise made between the two inductors is absorbed by this circuit.

The temperature sensor 12 with NTC and the temperature control circuit 1c comprises a temperature sensor 12 and a fifth, a sixth, a seventh, an eighth, a ninth resistors 145, 146, 147, 148, 149 and a first, a second transistors 161, 162 and a fourth diode 174, wherein the temperature sensor 12 with NTC is simply to sense the temperature; and wherein, after comparing the voltage difference, a second diode 162 (MOSFET) is used as a switch to speed up the resolving speed as the temperature gets higher. And the voltage is adjusted by several resistors (the fifth, the sixth, the seventh, the eighth and the ninth resistors 145, 146, 147, 148, 149) to make the resolving speed meet the need. So, the required resolving speed under a certain temperature can be obtained according to the temperature coefficient of the temperature sensor 12 with NTC and its resistance changes, as tied in with the voltage comparing circuit, to prevent the control unit 10 from thermal shutdown.

Figure 4:
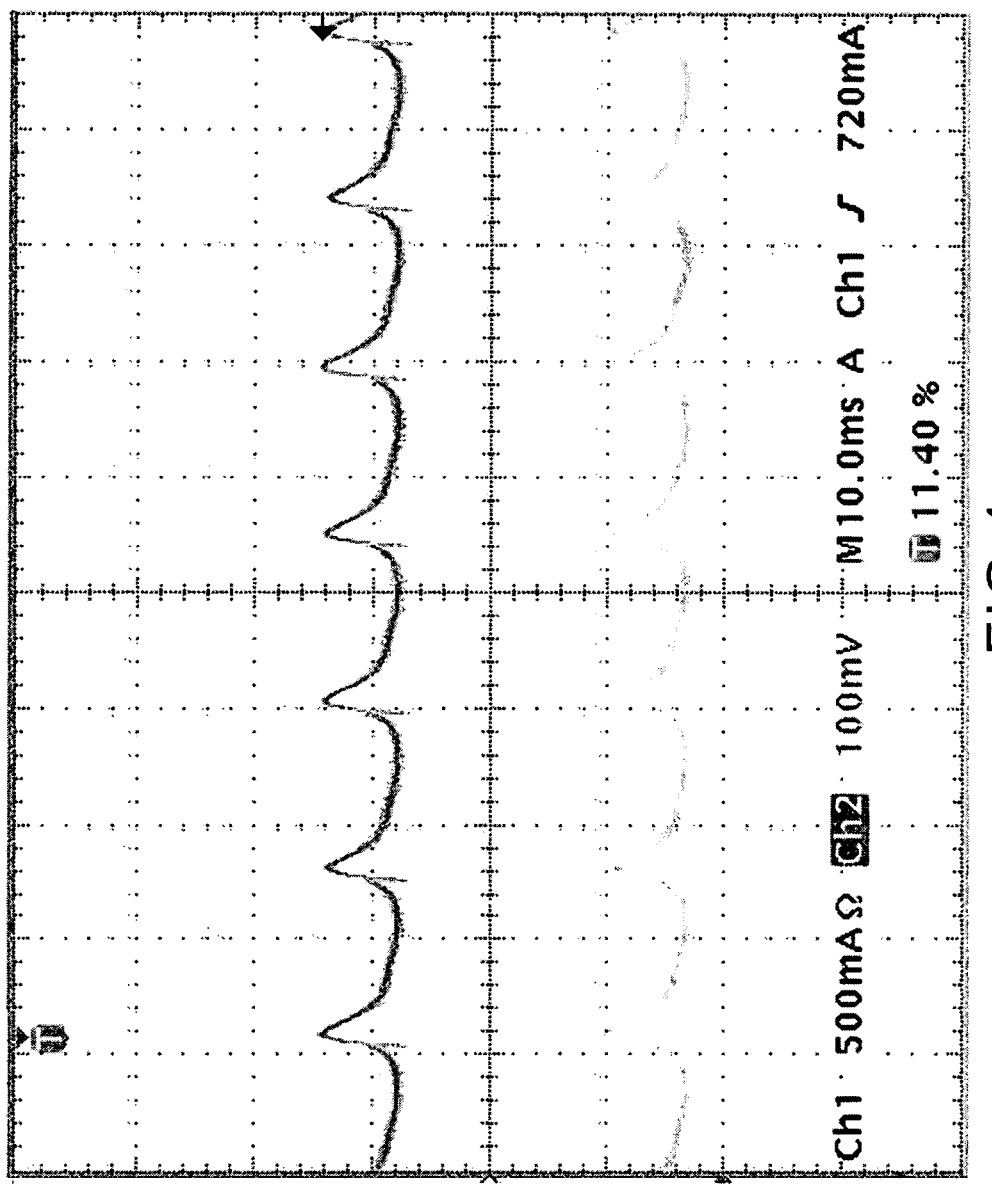
FIG. 4 is a scope image according to the present invention whose upper half shows the current waveform of the motor at low resolving speed and the lower half shows the corresponding standard signal line waveform of the thirteenth pin of the control unit.
Figure 5:
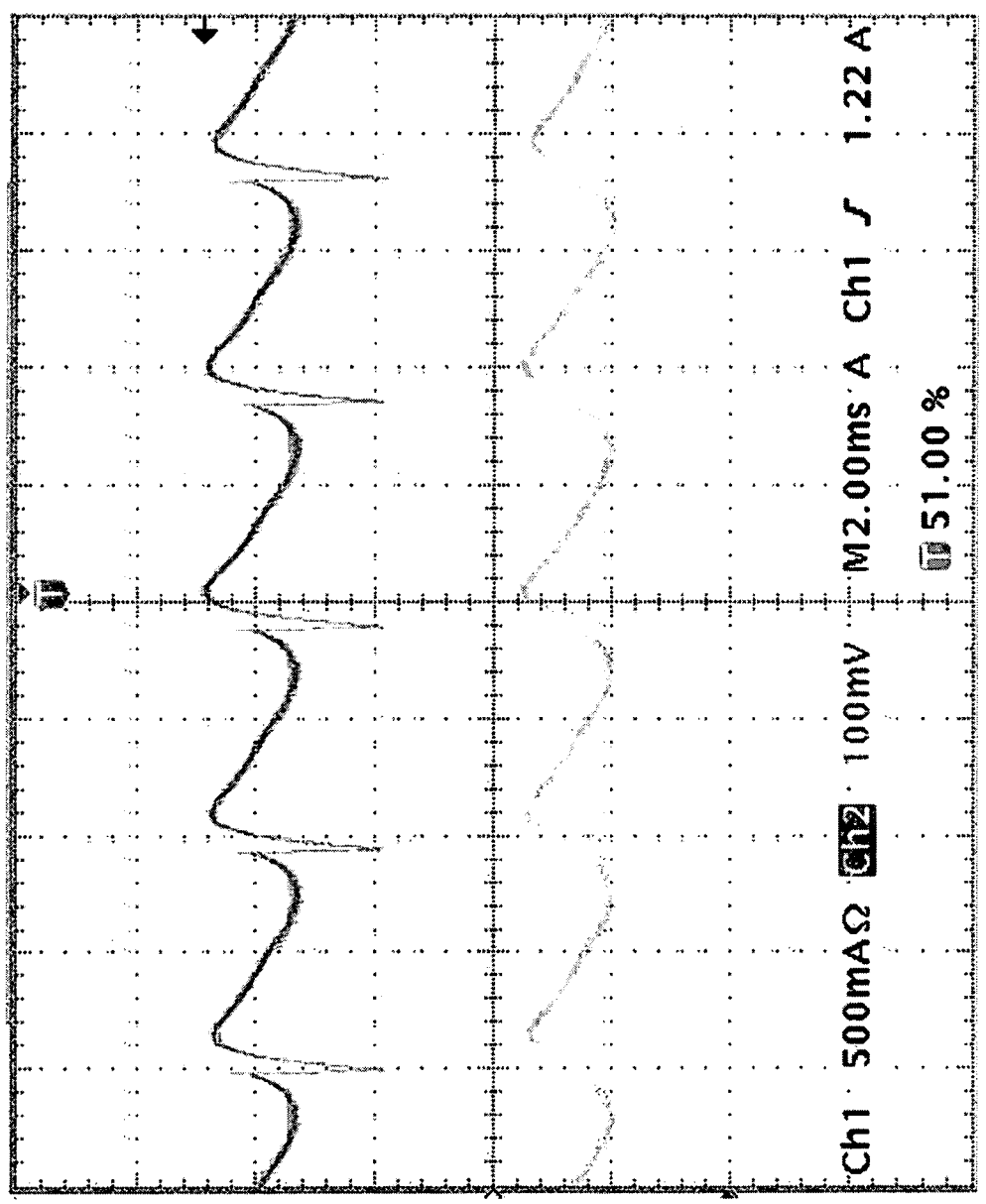
FIG. 5 is a scope image according to the present invention whose upper half shows the current waveform of the motor at high resolving speed and the lower half shows the corresponding standard signal line waveform of the thirteenth pin of the control unit.
Figure 6:
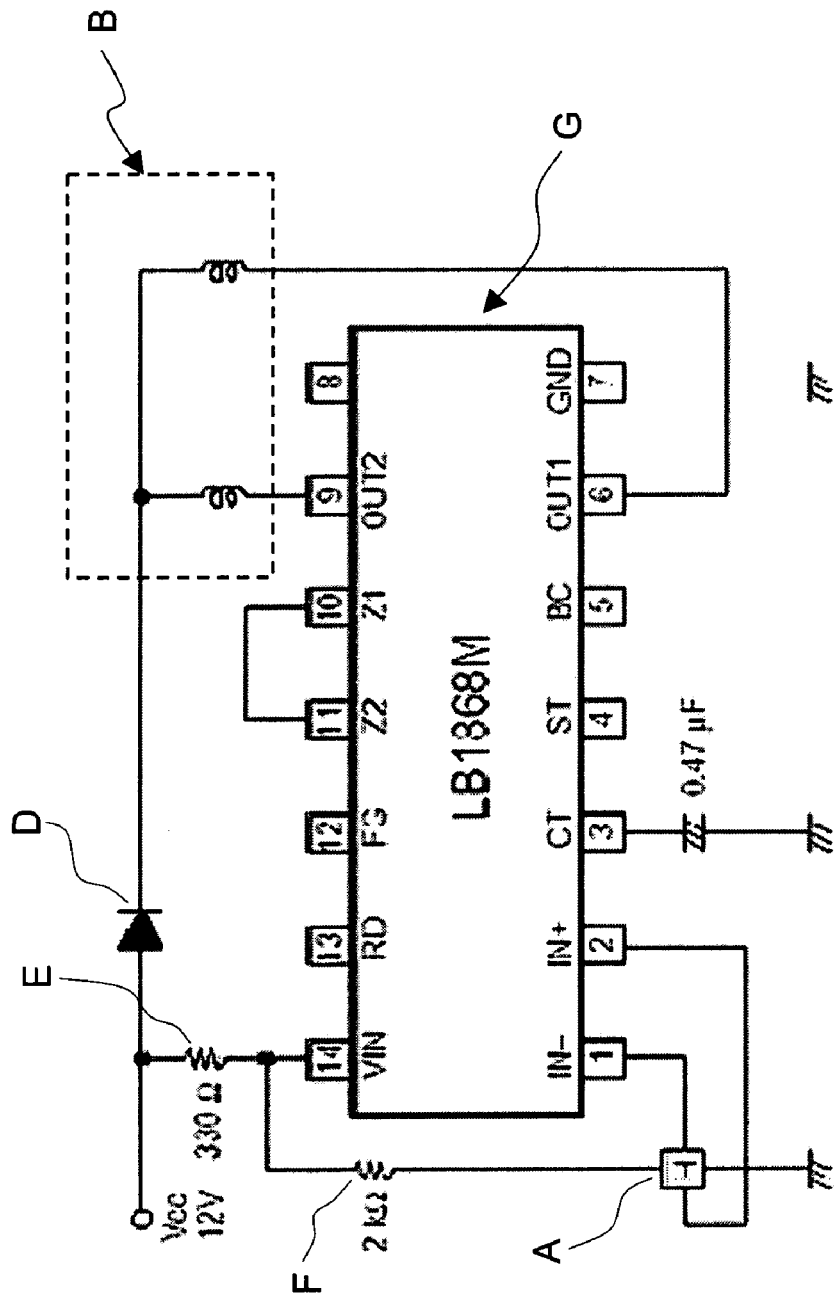
FIG. 6 is a control circuit diagram of the prior art.

Accordingly, a novel brushless DC fan motor driving circuit is obtained by the above control circuit. When the power is on, a signal is immediately sent to the control unit 10 and the control unit 10 is booted up to produce half-wave control signals to control the motor 13, whose waveform is shown in FIG. 4 as the current waveform of the motor 13 at low resolving speed. The upper half of FIG. 4 shows the waveform of the current outputted by the motor at low resolving speed, and the lower half is the standard signal line waveform of the thirteenth pin of the control unit 10 (i.e. LB1868M chip) in FIG. 2. As shown in the figure, the value of the peak current outputted by the fan is 720 mA whose power output can be amplified by the control unit 10 (Drive IC) together with transistors. When the motor 13 resolves at high speed, its running status is detected and adjusted by the Hall element 11 and the temperature sensor 12 with NTC, whose waveform is shown in FIG. 5 when using the temperature control circuit with a switch of MOSFET. The upper half of FIG. 5 shows the waveform of the current outputted by the motor 13 at high resolving speed, and the lower half is the corresponding standard signal line waveform of the thirteenth pin of the control unit 10 (i.e. LB1868M chip) in FIG. 2. As shown in the figure, the value of the peak current outputted by the fan is 1.22 A. According to FIG. 4 and FIG. 5, the present invention can reduce the power output and the input current of the IC by way of the motor 13 together with the control unit 10 (i.e. LB1868M chip) and the temperature sensor 12 with NTC. So, the present invention can control the resolving speed of the motor according to the signals produced by the temperature sensor 12 with NTC under different ambient temperature. By doing so, thermal shutdown of the control unit 10 can be avoided once the peak input current is too high which makes the control unit 10 become too hot. Therefore, by the above circuit components, the motor 13 can be controlled more efficiently. And the above circuit components can have further series or parallel connections with some basic circuit components (such as capacitors, resistors, diodes, transistors) to improve actual applications to meet special requests (such as matching).

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A brushless DC fan motor driving circuit, comprising a control unit, a Hall element, a circuit for reverse protection and voltage drop, a transistor amplifier circuit, a magnetic noise elimination and protection circuit, a temperature sensor with negative temperature coefficient (NTC), and a control circuit,
    wherein said Hall element, said circuit for reverse protection and voltage drop, said transistor amplifier circuit, said magnetic noise elimination and protection circuit, said temperature sensor, and said control circuit are connected with said control unit;
    wherein said control unit comprises a plurality of pins;
    wherein said Hall element is to detect the position of the rotor of a motor and to acquire the running status of said motor;
    wherein said circuit for reverse protection and voltage drop is to keep the voltage of said control unit in an acceptable range in case of reverse voltage feedback or wrongly plugged connector and to prevent said control unit from damage;
    wherein said transistor amplifier circuit is to amplify the power output from said control unit;
    wherein said magnetic noise elimination and protection circuit is to avoid the counter-electromotive force (CEMF) of said motor so that voltage is kept on a certain degree by restraining said CEMF and the magnetic noise made by said motor is absorbed;
    wherein said temperature sensor with negative temperature coefficient and control unit are for sensing temperature and, by comparing voltage burdens, when said temperature is getting higher, resolving speed is increased;
    wherein a third pin (CT) of said control unit is connected with a first capacitor and is grounded through first capacitor, and is connected with a third pin (GND) of said Hall element, and said third pin (GND) of said Hall element is grounded; and
    wherein said third pin (CT) of said control unit is a CT pin and said third pin (GND) of said Hall element is a ground pin.

2. The brushless DC fan motor driving circuit according to claim 1, wherein said control unit is a LB1868M chip.

3. The brushless DC fan motor driving circuit according to claim 1, wherein a first pin (IN−) of said control unit is connected with a fourth pin (IN−) of said Hall element.

4. The brushless DC fan motor driving circuit according to claim 1, wherein a second pin (IN+) of said control unit is connected with a second pin (IN+) of said Hall element.

5. The brushless DC fan motor driving circuit according to claim 1, wherein a seventh pin (GND) of said control unit is grounded and a tenth pin (Z1) of said control unit is connected with an eleventh pin (Z2) of said control unit.

6. The brushless DC fan motor driving circuit according to claim 1, wherein a thirteenth pin (RD) of the control unit is connected with a first pin of a connector.

7. The brushless DC fan motor driving circuit according to claim 1, wherein said transistor amplifier circuit is a Darlington pair.

8. A brushless DC fan motor driving circuit, comprising a control unit, a Hall element, a circuit for reverse protection and voltage drop, a transistor amplifier circuit, a magnetic noise elimination and protection circuit, a temperature sensor with negative temperature coefficient (NTC), and a control circuit,
    wherein said Hall element, said circuit for reverse protection and voltage drop, said transistor amplifier circuit, said magnetic noise elimination and protection circuit, said temperature sensor, and said control circuit are connected with said control unit;
    wherein said control unit comprises a plurality of pins;
    wherein said Hall element is to detect the position of the rotor of a motor and to acquire the running status of said motor;
    wherein said circuit for reverse protection and voltage drop is to keep the voltage of said control unit in an acceptable range in case of reverse voltage feedback or wrongly plugged connector and to prevent said control unit from damage;
    wherein said transistor amplifier circuit is to amplify the power output from said control unit;
    wherein said magnetic noise elimination and protection circuit is to avoid the counter-electromotive force (CEMF) of said motor so that voltage is kept on a certain degree by restraining said CEMF and the magnetic noise made by said motor is absorbed; and
    wherein said temperature sensor and control circuit with negative temperature coefficient is to sense temperature and, by comparing voltage burdens, when the temperature is getting higher, resolving speed is increased,
    wherein a sixth pin (OUT1) of said control unit is connected with a first, a second, a third and a fourth resistors;
    wherein said fourth resistor is connected with a ninth pin (OUT2) of said control unit;
    wherein said first resistor is connected with said second resistor through the base of a third transistor;
    wherein said third resistor is connected with said fourth resistor through the base of a fourth transistor;
    wherein the emitter of said third transistor is connected with the emitter of said fourth transistor by a first diode;

wherein said first diode is connected with a power supplier;

wherein the collector of said third transistor is connected with the collector of said fourth transistor through said motor;

wherein said motor is connected with a second diode and a third diode;

wherein said second diode is connected with said third diode through a Zener diode;

wherein said Zener diode is connected with a second transistor;

wherein said second transistor is connected with a fifth, a sixth and a seventh resistors;

wherein said sixth resistor is connected with said Zener diode;

wherein said seventh resistor is connected with said power supplier;

wherein said fifth resistor is connected with said seventh resistor through the base of a first transistor;

wherein the collector of said first transistor is connected with an eighth resistor and the emitter of said first transistor is connected with a fourth diode;

wherein said fourth diode is connected with a ninth resistor and said temperature sensor with NTC;

wherein said temperature sensor with NTC is connected with said power supplier and a third pin of a connector; and wherein the second pin of said connector is connected with said ninth resistor and then is grounded.

9. The brushless DC fan motor driving circuit according to claim 8, wherein said control unit is a LB1868M chip.

10. The brushless DC fan motor driving circuit according to claim 8, wherein a first pin (IN−) of said control unit is connected with a fourth pin (IN−) of said Hall element.

11. The brushless DC fan motor driving circuit according to claim 8, wherein a second pin (IN+) of said control unit is connected with a second pin (IN+) of said Hall element.

12. The brushless DC fan motor driving circuit according to claim 8, wherein a seventh pin (GND) of said control unit is grounded and a tenth pin (Z1) of said control unit is connected with an eleventh pin (Z2) of said control unit.

13. The brushless DC fan motor driving circuit according to claim 8, wherein a thirteenth pin (RD) of the control unit is connected with a first pin of a connector.

14. The brushless DC fan motor driving circuit according to claim 8, wherein said transistor amplifier circuit is a Darlington pair.

15. A brushless DC fan motor driving circuit, comprising a control unit, a Hall element, a circuit for reverse protection and voltage drop, a transistor amplifier circuit, a magnetic noise elimination and protection circuit, a temperature sensor with negative temperature coefficient (NTC), and a control circuit, wherein said Hall element, said circuit for reverse protection and voltage drop, said transistor amplifier circuit, said magnetic noise elimination and protection circuit, said temperature sensor, and said control circuit are connected with said control unit;

wherein said control unit comprises a plurality of pins;

wherein said Hall element is to detect the position of the rotor of a motor and to acquire the running status of said motor;

wherein said circuit for reverse protection and voltage drop is to keep the voltage of said control unit in an acceptable range in case of reverse voltage feedback or wrongly plugged connector and to prevent said control unit from damage;

wherein said transistor amplifier circuit is to amplify the power output from said control unit;

wherein said magnetic noise elimination and protection circuit is to avoid the counter-electromotive force (CEMF) of said motor so that voltage is kept on a certain degree by restraining said CEMF and the magnetic noise made by said motor is absorbed; and wherein said temperature sensor and control circuit with negative temperature coefficient is to sense temperature and, by comparing voltage burdens, when the temperature is getting higher, resolving speed is increased, wherein a fourteenth pin (VIN) of said control unit is connected with a tenth resistor;

wherein said tenth resistor is connected with a first pin of said Hall element; wherein said fourteenth pin (VIN) of said control unit is connected with an eleventh resistor which is connected with a power supplier and is connected with a second capacitor which is grounded; and wherein said second capacitor is connected with a seventh pin of said control unit.

16. The brushless DC fan motor driving circuit according to claim 15, wherein said control unit is a LB1868M chip.

17. The brushless DC fan motor driving circuit according to claim 15, wherein a first pin (IN−) of said control unit is connected with a fourth pin (IN−) of said Hall element.

18. The brushless DC fan motor driving circuit according to claim 15, wherein a second pin (IN+) of said control unit is connected with a second pin (IN+) of said Hall element.

19. The brushless DC fan motor driving circuit according to claim 15, wherein a seventh pin (GND) of said control unit is grounded and a tenth pin (Z1) of said control unit is connected with an eleventh pin (Z2) of said control unit.

20. The brushless DC fan motor driving circuit according to claim 15, wherein a thirteenth pin (RD) of the control unit is connected with a first pin of a connector.

21. The brushless DC fan motor driving circuit according to claim 15, wherein said transistor amplifier circuit is a Darlington pair.

* * * * *